US012750548B2

(12) United States Patent
Fan et al.

(10) Patent No.: US 12,750,548 B2
(45) Date of Patent: Sep. 29, 2026

(54) INTERACTION METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Teng Fan, Beijing (CN); Jiaqin Cai, Beijing (CN); Yijie Li, Beijing (CN); Yi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 93 days.

(21) Appl. No.: 18/875,711

(22) PCT Filed: Oct. 25, 2023

(86) PCT No.: PCT/CN2023/126568
§ 371 (c)(1),
(2) Date: Dec. 16, 2024

(87) PCT Pub. No.: WO2024/088316
PCT Pub. Date: May 2, 2024

(65) Prior Publication Data

US 2025/0373880 A1 Dec. 4, 2025

(30) Foreign Application Priority Data

Oct. 25, 2022 (CN) ......................... 202211314055.0

(51) Int. Cl.
*H04N 21/431* (2011.01)
*H04N 21/233* (2011.01)
(Continued)

(52) U.S. Cl.
CPC ......... *H04N 21/431* (2013.01); *H04N 21/233* (2013.01); *H04N 21/2393* (2013.01); *H04N 21/2187* (2013.01)

(58) Field of Classification Search
CPC ............... H04N 21/431; H04N 21/233; H04N 21/2393; H04N 21/2187
See application file for complete search history.

(56) References Cited

U.S. PATENT DOCUMENTS

2021/0044640 A1* 2/2021 He .......................... G10L 15/26
2023/0162451 A1* 5/2023 Wang ...................... A63F 13/86
345/633
(Continued)

FOREIGN PATENT DOCUMENTS

CN 104333783 A 2/2015
CN 109286851 A 1/2019
(Continued)

OTHER PUBLICATIONS

International Patent Application No. PCT/CN2023/126568; Int'l Search Report; dated Jan. 3, 2024; 2 pages.
(Continued)

*Primary Examiner* — Mulugeta Mengesha
(74) *Attorney, Agent, or Firm* — BakerHostetler

(57) ABSTRACT

Disclosed are an interaction method and apparatus, an electronic device, a storage medium, and a program product. The method includes: receiving a task request operation from a current user; and sending, in response to the task request operation, a preset virtual object to a first user corresponding to the task request operation, and adding the first user to a target user list of a current live-stream room, where the preset virtual object is used to request a user who receives the preset virtual object to perform a first task.

17 Claims, 9 Drawing Sheets

(51) Int. Cl.
*H04N 21/239* (2011.01)
*H04N 21/2187* (2011.01)

(56) References Cited

U.S. PATENT DOCUMENTS

| | | | | |
|---|---|---|---|---|
| 2024/0069706 | A1* | 2/2024 | Dong | G06F 3/0482 |
| 2025/0142137 | A1* | 5/2025 | Tan | H04N 21/47205 |
| 2025/0142138 | A1* | 5/2025 | Zhang | H04N 21/2187 |

FOREIGN PATENT DOCUMENTS

| | | | |
|---|---|---|---|
| CN | 113518237 | A | 10/2021 |
| CN | 114390299 | A | 4/2022 |
| CN | 115599483 | A | 1/2023 |
| JP | 2022-078323 | A | 5/2022 |

OTHER PUBLICATIONS

Japan Patent Application No. 2024-573763; Decision to Grant; dated Feb. 24, 2026; 5 pages.

* cited by examiner

FIG.5
43
Target control
Live-stream page

INTERACTION METHOD AND APPARATUS, ELECTRONIC DEVICE, STORAGE MEDIUM, AND PROGRAM PRODUCT

CROSS-REFERENCE TO RELATED APPLICATION(S)

This application is a national stage application filed under 35 U.S.C. 371 based on International Patent Application No. PCT/CN2023/126568, filed on Oct. 25, 2023, which claims priority to Chinese patent application No. 202211314055.0, filed with the China National Intellectual Property Administration on Oct. 25, 2022, which are incorporated herein by reference in their entireties.

FIELD

The present disclosure relates to the field of computer technology, and for example, relates to an interaction method and apparatus, an electronic device, a storage medium, and a program product.

BACKGROUND

In some application software, viewers can request songs by giving gifts when watching live broadcasts, such as specifying a song to be performed by a guest in a live-stream room. However, the method for requesting songs is relatively simple, and the operation for the user to request songs in the live-stream room is relatively complex, which cannot satisfy user requirements.

SUMMARY

The present disclosure provides an interaction method and apparatus, an electronic device, a storage medium, and a program product, thereby enriching methods for requesting songs in a live-stream room, and simplifying the operations required for song requests.

An embodiment of the present disclosure provides an interaction method, including:

- receiving a task request operation from a current user; and
- sending, in response to the task request operation, a preset virtual object to a first user corresponding to the task request operation, and adding the first user to a target user list of the current live-stream room, where the preset virtual object is used to request a user who receives the preset virtual object to perform a first task.

An embodiment of the present disclosure further provides an interaction apparatus, including:

- an operation receiving module, configured to receive a task request operation from a current user; and
- an object sending module, configured to send, in response to the task request operation, a preset virtual object to the first user corresponding to the task request operation, and add the first user to a target user list of the current live-stream room, where the preset virtual object is used to request a user who receives the preset virtual object to perform a first task.

An embodiment of the present disclosure further provides an electronic device, including:

- one or more processors; and
- a memory, configured to store one or more programs.

The one or more programs, when executed by the one or more processors, cause the one or more processors to implement the interaction method according to this embodiment of the present disclosure.

An embodiment of the present disclosure further provides a computer-readable storage medium, storing a computer program. The computer program, when executed by a processor, implements the interaction method according to this embodiment of the present disclosure.

An embodiment of the present disclosure further provides a computer program product. The computer program product, when executed by a computer, causes the computer to implement the interaction method according to this embodiment of the present disclosure.

DETAILED DESCRIPTION OF EMBODIMENTS

Figure 1:
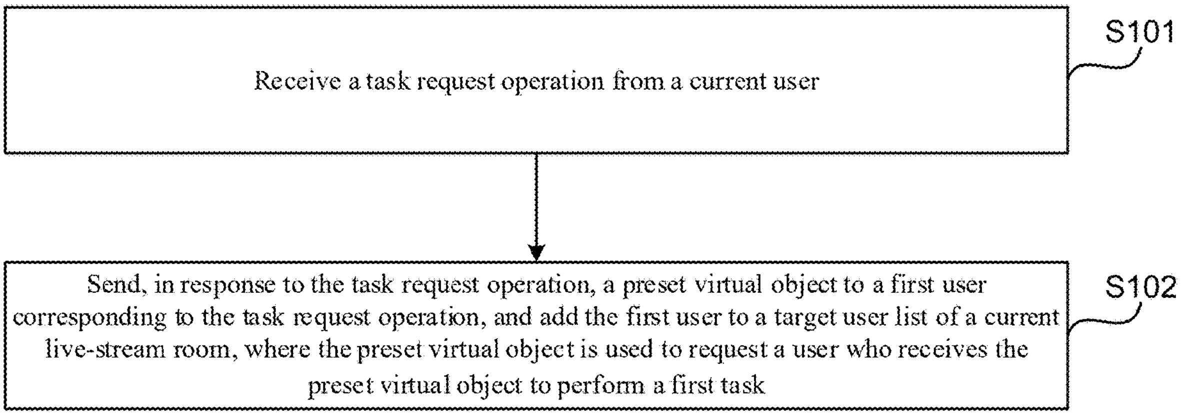
FIG. 1 is a schematic flowchart of an interaction method according to an embodiment of the present disclosure.

Embodiments of the present disclosure will be described with reference to the accompanying drawings below. Although the accompanying drawings show some embodiments of the present disclosure, the present disclosure may be implemented in various forms, and should not be construed as being limited to the embodiments stated herein. On the contrary, these embodiments are provided for an understanding of the present disclosure. The accompanying drawings and the embodiments of the present disclosure are for exemplary purposes only, and are not intended to limit the scope of protection of the present disclosure.

A plurality of steps recorded in method implementations in the present disclosure may be performed in different orders and/or in parallel. In addition, additional steps may be included and/or the execution of the illustrated steps may be omitted in the method implementations. The scope of the present disclosure is not limited in this aspect.

The term “including” used herein and variations thereof are open-ended inclusions, namely “including but not limited to". The term "based on" is interpreted as "at least partially based on". The term "an embodiment" means "at least one embodiment"; the term "another embodiment" means "at least one additional embodiment"; and the term "some embodiments" means "at least some embodiments". Related definitions of other terms will be given in the description below.

Concepts such as "first" and "second" mentioned in the present disclosure are only for distinguishing different apparatuses, modules, or units, and are not intended to limit the order or relation of interdependence of functions performed by these apparatuses, modules, or units.

The modifiers "one" and "a plurality of" mentioned in the present disclosure are illustrative and not restrictive, and should be understood as "one or more" unless otherwise indicated in the context.

The names of messages or information exchanged between a plurality of apparatuses in the implementations of the present disclosure are provided for illustrative purposes only, and are not used to limit the scope of these messages or information.

Before the use of the technical solutions disclosed in the plurality of embodiments of the present disclosure, a user shall be informed of the type, range of use, application scenarios, etc., of personal information involved in the present disclosure in an appropriate manner in accordance with the relevant laws and regulations, and the authorization of the user shall be obtained.

For example, in response to reception of an active request from the user, a prompt message is sent to the user to clearly inform the user that a requested operation will require access to and use of the personal information of the user. As such, the user can independently choose, based on the prompt message, whether to provide the personal information to software or hardware, such as an electronic device, an application, a server, or a storage medium, that performs the operations of the technical solutions of the present disclosure.

As an optional but non-limiting implementation, in response to the reception of the active request from the user, the method for sending the prompt message to the user may be, for example, a pop-up window, in which the prompt message may be presented in text. Further, the pop-up window may also carry a selection control for the user to choose whether to "agree" or "disagree" to provide the personal information to the electronic device.

The above notification and user authorization obtaining process is only illustrative, which does not limit the implementations of the present disclosure, and other methods that comply with relevant laws and regulations may also be applied to the implementations of the present disclosure.

FIG. 1 is a schematic flowchart of an interaction method according to an embodiment of the present disclosure. The method may be performed by an interaction apparatus. The apparatus may be implemented by software and/or hardware, and may be configured in an electronic device, such as a mobile phone or a tablet personal computer. The interaction method provided in this embodiment of the present disclosure is suitable for a scenario where a user from a current live-stream room is requested to perform a first task in the current live-stream room. As shown in FIG. 1, the interaction method provided in this embodiment may include the following steps.

S101: Receive a task request operation from a current user.

The current user may be a user who performs the task request operation, such as a user corresponding to an account logged in to a current application. The current user may be a user in the current live-stream room, such as a viewer or a task guest in the current live-stream room. One or more users in the current live-stream room may request the user in the current live-stream room to perform a first task by giving preset virtual objects.

The task request operation may be a trigger operation used to indicate sending a preset virtual object to one or more users in the current live-stream room to request the one or more users to perform the first task. The task request operation may be a request operation dimensioned by user. In other words, the task request operation may be used only to specify a requested first user, and in this case, it is not necessary for the current user to specify a task content of the first task that the first user needs to perform. Exemplarily, the task request operation may include a trigger operation for giving a preset virtual object to the user in the current live-stream room, or may also include a selection completion operation for selecting a user to whom the task request operation intends to request the execution of the first task. The selection completion operation may be a trigger operation used to determine the user selected by the selection completion operation.

In this embodiment, the task request operation from the current user may be received. For example, when it is detected that the user performs a giving operation to give a preset virtual object to a user in the current live-stream room in a first virtual object panel, or when it is detected that the user selects one or more candidate users in a candidate user list and performs the selection completion operation, it may be determined that the task request operation is received.

S102: Send, in response to the task request operation, a preset virtual object to the first user corresponding to the task request operation, and add the first user to a target user list of the current live-stream room, where the preset virtual object is used to request a user who receives the preset virtual object to perform the first task.

The preset virtual object may be a virtual object used to request the receiving user of the preset virtual object to perform the first task. The virtual object may include, for example, a virtual gift and/or a virtual item. The receiving user may be a user who receives the preset virtual object. The preset virtual object may be set by a streamer of the current live-stream room. Different streamers may set the same or different virtual objects as preset virtual objects. The same streamer may also set the same or different virtual objects as preset virtual objects in the same live broadcast or different live broadcasts.

The first user may be a user in the current live-stream room requested by the task request operation to perform the first task, such as the receiving user of the preset virtual object. The first user may be any user in the current live-stream room, such as a task guest in the current live-stream room. The task guest may include, for example, the streamer of the current live-stream room and a user who is connected for a live chat with the streamer of the current live-stream room. The following is a description of using the first user being the task guest of the current live-stream room as an example.

The target user list may be a list used to display task information for a second user. The second user may be understood as a user in the current live-stream room requested to perform the first task. The second user may include a current task-performing user and/or a pending task-performing user, or may also include a task-completed user. After the first user is added to the target user list, the first user becomes one of the second users in the target user list. The task information for the second user may be related information about the second user. The task information may include identifier information of the second user and may also include identifier information of a requesting user corresponding to the second user. The requesting user may be a user who requests the second user to perform the first task. The identifier information of the second user may include, for example, a user avatar and/or a user nickname of the second user. The identifier information of the requesting user may include, for example, a user avatar of the requesting user. The first task may be a performance task and/or other tasks in addition to the performance task, such as a question-answering task. The first task may be a preset task or a random task, which is set by any one of the streamer, the requesting user, and the second user, or determined through discussion by at least two of the streamer, the requesting user, and the second user. A task content of the first task performed by different second users may be the same or different, and a task content of the first task performed by the same second user at different times may be the same or different.

For the same second user, if there are a plurality of users in the current live-stream room who request the second user to perform the first task by giving the preset virtual objects, that is, if there are a plurality of corresponding requesting users for the second user, one or more pieces of task information for the second user may exist in the target user list, more pieces of task information for the second user may exist, that is, different task information may be displayed when the requesting users and/or the second users are different.

Exemplarily, when the task request operation from the current user is received, sending the preset virtual object to the first user may be triggered, and the first user is added to the target user list in the current live-stream room.

Exemplarily, when the task request operation from the current user is received, the preset virtual object may be sent to the first user directly or through a server, such as updating the number of preset virtual objects in a first user account, or updating an account balance of the first user; and task information corresponding to the first user and the current user is added to the target user list, such as adding a piece of task information including a user identifier of the first user and a user identifier of the current user to the end of the target user list.

After the first user is added to the target user list of the current live-stream room, whether the first user starts performing the first task immediately may be determined based on the order of at least one piece of task information in the target user list and/or a task starting operation of the streamer in the current live-stream room.

In this embodiment, the user may request the corresponding user in the current live-stream room to perform the first task by giving the preset virtual object without selecting the task content or the virtual object to be given during requesting in a preset form. Compared with a song-request solution dimensioned by song and of selecting and giving virtual gifts of a certain amount, request methods for requesting other people in the current live-stream room to perform a task can be enriched, and the operation required by requesting other people to perform the task in the current live-stream room is simplified. Additionally, since there is no need to specify the task content, task performing forms in the current live-stream room may also be enriched, and viewing experience and task performing experience of the user in the current live-stream room are improved.

In this embodiment, requesting the other user to perform the first task may be an interaction mode provided by the current application, such as an interaction mode provided by a preset game in the current application. In this case, after the streamer of the current live-stream room initiates the preset game, the user in the current live-stream room may request other users in the current live-stream room to perform the first task by giving the preset virtual object set by the streamer. When the streamer of the current live-stream room has not initiated the preset game or after the streamer of the current live-stream room closes the preset game, the user in the current live-stream room cannot request the other users in the current live-stream room to perform the first task by giving the preset virtual object.

In some implementations, the streamer may set the preset virtual object for requesting the user in the current live-stream room to perform the first task when initiating the preset game. In this case, optionally, the current user includes the streamer of the current live-stream room. The method further includes, before receiving the task request operation from the current user: displaying a preset virtual object selection panel in response to an initiation operation for the preset game; and using, in response to a selection completion operation in the preset virtual object selection panel, a virtual object selected by the current user in the preset virtual object selection panel as a preset virtual object for the preset game, and initiating the preset game.

The initiation operation for the preset game may be a trigger operation used to indicate the initiation of the preset game in the current live-stream room, such as an operation of triggering a game identifier of the preset game in a function panel of the current live-stream room. The preset virtual object selection panel may be a panel for the streamer to select a preset virtual object used to request the execution of the first task after initiating the preset game this time. The preset virtual object selection panel may display one or more virtual object identifiers. The selection completion operation may be a trigger operation used to indicate that the streamer finishes selecting the preset virtual object, such as an operation of triggering a confirmation control in the preset virtual object selection panel.

Figure 2:
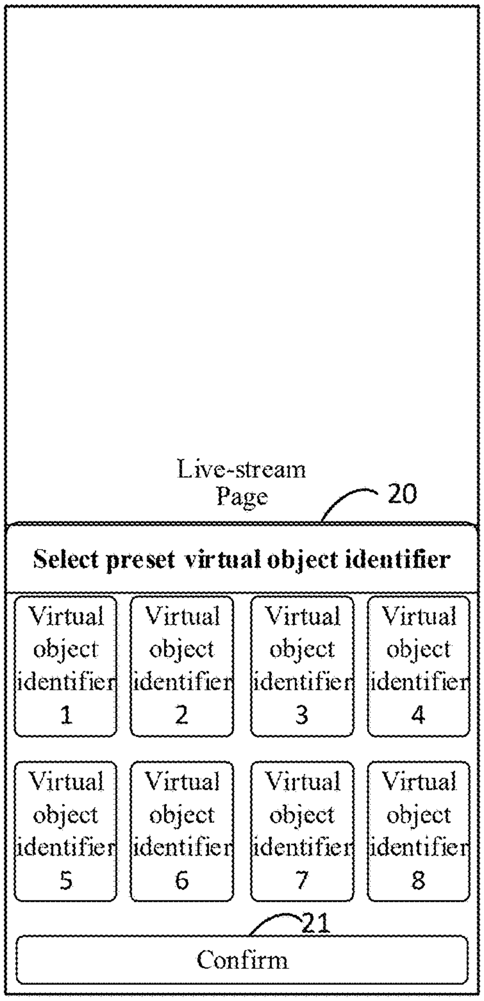
FIG. 2 is a schematic diagram of the display of a preset virtual object selection panel according to an embodiment of the present disclosure.

Exemplarily, when the current user is the streamer of the current live-stream room, that is, after the current user initiates the live broadcast, a function panel may be displayed when the current application detects that the current user triggers a function control displayed on a live-stream page of the current live-stream room, and the function panel displays a game identifier of each interactive game; and when it is detected that the current user triggers the game identifier of the preset game displayed in the function panel, a preset virtual object selection panel 20 may be displayed, and at least one virtual object identifier is displayed in the preset virtual object selection panel 20, as shown in FIG. 2.

Therefore, the current user may select a preset virtual object by triggering a virtual object identifier of a virtual object to be selected in the preset virtual object selection panel 20 and may trigger a confirmation control 21 in the preset virtual object selection panel 20 after completing the selection.

Correspondingly, after the current application receives the selection completion operation from the current user, for example, when the current application detects that the current user triggers the confirmation control 21 in the preset virtual object selection panel 20, the current application may use the virtual object corresponding to the virtual object identifier in a selected state in the preset virtual object selection panel 20 as the preset virtual object and initiate the preset game in the current live-stream room.

In the above implementation, exemplarily, after the preset game is initiated, a game initiation prompt message may be displayed in the current live-stream room to notify the user in the current live-stream room that the preset game has been initiated. Additionally, at least one of task performing information and a target control for a second task by at least one candidate user in the current live-stream room may also be additionally displayed on the live-stream page of the current live-stream room, thereby facilitating viewing or interaction by the user in the current live-stream room.

In this embodiment, the streamer of the current live-stream room may set the preset virtual object for requesting the user in the current live-stream room to perform the first task, and therefore after selecting the user requested to perform the first task, the user in the current live-stream room may directly give the preset virtual object or request the other user to perform the first task by giving the preset virtual object in the virtual object panel, thereby satisfying personalized requirements of the streamer, simplifying the operation required for the user in the current live-stream room to request the other user to perform the first task, and enriching the request methods for requesting the other user to perform the first task.

The current application may also set or replace the preset virtual object of the preset game after the preset game is initiated. Alternatively, the preset virtual object may also be a default virtual object set by operational personnel. In this case, if the streamer does not set the preset virtual object when initiating or after initiating the preset game, the default virtual object may be used as the preset virtual object after initiating the preset game this time. After a user receives the preset virtual object given by the requesting user, and/or, after the streamer indicates a user to perform the first task through a task starting operation, the user may or may not have the permission to reject performing the first task. When the user has the permission to reject performing the first task and rejects performing the first task, the preset virtual object may be returned to the requesting user or not returned to the requesting user, which may be flexibly set according to needs.

According to the interaction method provided in this embodiment, the task request operation from the current user is received; and in response to the task request operation, the preset virtual object is sent to the first user corresponding to the task request operation, and the first user is added to the target user list of the current live-stream room, where the preset virtual object is used to request a user who receives the preset virtual object to perform the first task. By adopting the above technical solution in this embodiment, the corresponding user in the current live-stream room is requested to perform the first task by giving the preset virtual object, thereby achieving the task performing requirement dimensioned by user, enriching task requesting forms and task performing methods in the live-stream room, and simplifying the operation required for requesting other people to perform the task in the live-stream room.

Figure 3:
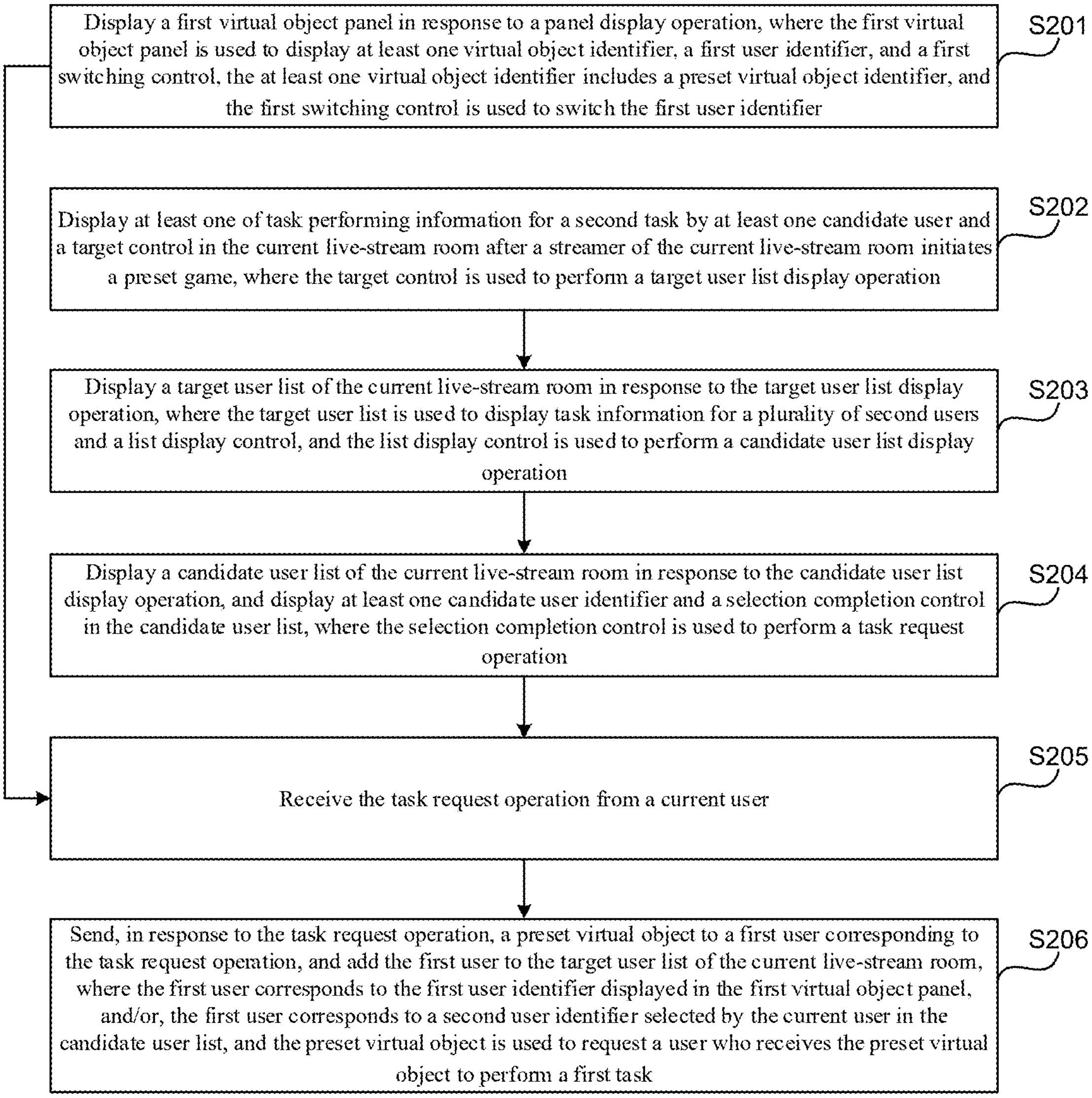
FIG. 3 is a schematic flowchart of another interaction method according to an embodiment of the present disclosure.

FIG. 3 is a schematic flowchart of another interaction method according to an embodiment of the present disclosure. The solution in this embodiment may be combined with one or more optional solutions in the above embodiment. Optionally, the first user corresponds to a first user identifier displayed in a first virtual object panel. The method further includes, before receiving the task request operation from the current user: displaying the first virtual object panel in response to a panel display operation, and displaying at least one virtual object identifier, a first user identifier, and a first switching control in the first virtual object panel, where the at least one virtual object identifier includes a preset virtual object identifier, and the first switching control is used to switch the first user identifier.

Optionally, the first user corresponds to a second user identifier selected by the current user in a candidate user list. The method further includes, before receiving the task request operation from the current user: displaying the candidate user list of the current live-stream room in response to a candidate user list display operation, and displaying at least one candidate user identifier and a selection completion control in the candidate user list, where the selection completion control is used to perform the task request operation.

Optionally, the interaction method provided in this embodiment further includes: displaying a target user list of the current live-stream room in response to a target user list display operation, where the target user list is used to display task information for a plurality of second users and a list display control, the second users include a current task-performing user and a pending task-performing user, and the list display control is used to perform the candidate user list display operation.

Optionally, before the displaying a target user list of the current live-stream room, the method further includes: displaying at least one of task performing information and a target control for a second task by at least one candidate user in the current live-stream room after the streamer of the current live-stream room initiates a preset game, where the target control is used to perform the target user list display operation.

As shown in FIG. 3, the interaction method provided in this embodiment may include the following steps.

S201: Display a first virtual object panel in response to a panel display operation, and perform S205, where the first virtual object panel is used to display at least one virtual object identifier, a first user identifier, and a first switching control, the at least one virtual object identifier includes a preset virtual object identifier, and the first switching control is used to switch the first user identifier.

The panel display operation may be an operation used to indicate the display of the first virtual object panel, such as an operation of triggering a panel control displayed on a live-stream page of the current live-stream room. The first virtual object panel may be a virtual object panel for a user to give a virtual object in the current live-stream room, such as a gift panel. The first virtual object panel may be used to display a plurality of virtual object identifiers including the preset virtual object identifier. The preset virtual object identifier displayed in the first virtual object panel or a giving control corresponding to the preset virtual object identifier may be used to give the preset virtual object to the user corresponding to the first user identifier to request the user corresponding to the first user identifier to perform the first task. The virtual object identifier is an identifier of a virtual object, and the preset virtual object identifier may be an identifier of a preset virtual object. The identifier may include, for example, an image and/or a name of the virtual object, etc. The first user identifier may be the currently displayed user identifier in the first virtual object panel. The user identifier may be an identifier of a user in the current live-stream room. The user may be, for example, a candidate user in the current live-stream room, such as a task guest. The following is a description of using the first user identifier being the candidate user identifier as an example. The first switching control may be a control used to switch the first user identifier.

Figure 4:
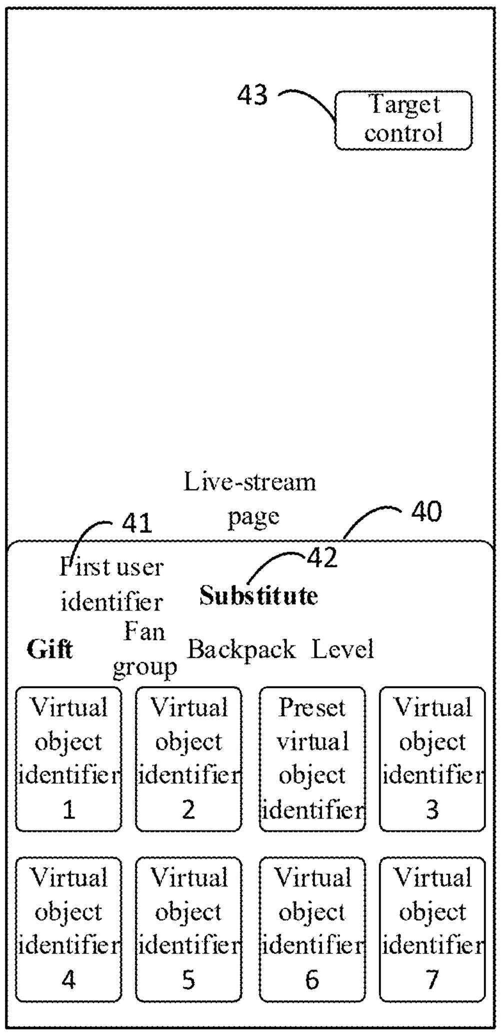
FIG. 4 is a schematic diagram of the display of a first virtual object panel according to an embodiment of the present disclosure.

Exemplarily, when the panel display operation is received, for example, when it is detected that the current user triggers the panel control displayed on the live-stream page, a first virtual object panel 40 may be displayed, and at least one virtual object identifier, a first user identifier 41 (e.g., a user identifier of the current task-performing user), and a first switching control 42 are displayed in the first virtual object panel 40, as shown in FIG. 4. The at least one virtual object identifier may include, for example, the preset virtual object identifier.

Therefore, after the first virtual object panel 40 is displayed, the current user may switch, by triggering the first switching control 42, the first user identifier 41 displayed in the first virtual object panel 40.

For example, when the current application detects that the current application triggers the first switching control 42 displayed in the first virtual object panel 40, the user identifier displayed in the first virtual object panel 40 may be switched according to a preset sequence, for example, the user identifier displayed in the first virtual object panel 40 is switched according to an order of at least one candidate user identifier in the candidate user list; alternatively, the candidate user list may be displayed for the current user to select one or more candidate user identifiers in the candidate user list as the first user identifier 41, and when it is detected that the current user completes the selection, the display of the candidate user list is canceled, and the candidate user identifier selected by the current user in the candidate user list is displayed in the first virtual object panel 40.

After the first virtual object panel 40 is displayed, the current user may switch the virtual object identifier displayed in the first virtual object panel 40. For example, when the first virtual object panel 40 is initially displayed in response to the panel display operation, the first virtual object panel 40 may or may not display the preset virtual object identifier. When the preset virtual object identifier is displayed or not displayed, the current user may switch the virtual object identifier displayed in the first virtual object panel 40 according to needs.

After the first virtual object panel 40 is displayed, the current user may give, by triggering a virtual object identifier displayed in the first virtual object panel 40, a virtual object corresponding to the virtual object identifier. For example, when it is detected that the current user triggers a virtual object identifier displayed in the first virtual object panel 40, a giving control corresponding to the virtual object identifier may be displayed. When it is detected that the current user triggers the giving control, in the case that the virtual object identifier is the preset virtual object identifier, a user corresponding to the first user identifier 41 may be treated as the first user, and the trigger operation is treated as the task request operation to give the virtual object to the first user, thereby requesting the first user to perform the first task, such as adding the first user to the target user list; and in the case that the virtual object identifier is not the preset virtual object identifier, the virtual object may be given to the user corresponding to the first user identifier 41, and in this case, the first user is not requested to perform the first task.

After giving a virtual object, the display of the first virtual object panel may be kept until a close operation for the first virtual object panel is received; alternatively, the display of the first virtual object panel may be canceled, which may be set according to needs.

In this embodiment, the user may request other users in the current live-stream room to perform the first task by giving the preset virtual object in the first virtual object panel, and may give other virtual objects in addition to the preset virtual object in the first virtual object panel, thereby enriching functions of the first virtual object panel and request methods for requesting the other users to perform the first task, and improving user experience.

S202: Display at least one of task performing information and a target control for a second task by at least one candidate user in the current live-stream room after the streamer of the current live-stream room initiates the preset game, where the target control is used to perform the target user list display operation.

The second task may be a preset task in the preset game. The user in the current live-stream room (e.g., the candidate user) may obtain a task reward for the second task, such as a virtual item, by performing the first task. Taking the virtual item being a golden microphone and the second task being s a golden microphone challenge task as an example, the second user may obtain task points for the second task by performing the first task, and when the task points for the second task reach a certain value, the second user may complete the golden microphone challenge task and obtain the golden microphone. After the preset game is initiated, the second task may be started for at least one candidate user in the current live-stream room, or for the current task-performing user. After one execution of the second task is completed, the second task may be started again, such that the corresponding user performs the second task again to obtain the task reward for the second task again. The task points for the second task may be determined based on a task completion status of the corresponding user when performing the second task, a support condition of viewers in the current live-stream room for the user, or the popularity of the live-stream room when the user performs the first task.

The task completion status of the user may be determined by a pre-trained task completion status determination model, obtained from viewer evaluations, or determined based on a viewer voting condition. The support condition from the viewers to the user may be determined based on the total number of support items received by the user after initiating the second task this time. For example, the task points of the user may be determined based on the number of support items received by the user after initiating the second task this time. The support items may be set virtual items or physical items, etc. The popularity of the live-stream room when the user performs the first task may be understood as the popularity in the current live-stream room when the user performs the first task, which may be determined based on a viewer interaction condition when the user performs the first task. The viewer interaction condition may include, for example, the number of likes from the viewers in the current live-stream room or the number of comment messages sent by the viewers in the current live-stream room, etc.

The task performing information may be execution condition information of the user for the second task, which may include quantity information of virtual items (e.g., the golden microphone) obtained by the user after initiating the preset game this time. The target control may be a control used to perform the target user list display operation. This embodiment does not limit information displayed in the target control. For example, the target control may display task performing information and/or execution progress information of the current task-performing user.

Figure 5:
FIG. 5 is a schematic diagram of the display of a target control according to an embodiment of the present disclosure.

In this embodiment, after the streamer in the current live-stream room initiates the preset game, for a streamer side and/or each viewer side of the current live-stream room, task performing information of at least one candidate user for the second task may be displayed and updated in real time on the live-stream page of the current live-stream room; and/or, a target control 43 is displayed on the live-stream page of the current live-stream room, as shown in FIG. 5, to facilitate the current user to perform the target user list display operation, and when there is the current task-performing user, the task performing information and the execution progress information of the current task-performing user may be displayed and updated in real time in the target control to enrich the content displayed on the live-stream page.

S203: Display the target user list of the current live-stream room in response to the target user list display operation, where the target user list is used to display task information for a plurality of second users and a list display control, the second users include a current task-performing user and a pending task-performing user, and the list display control is used to perform the candidate user list display operation.

Figure 6:
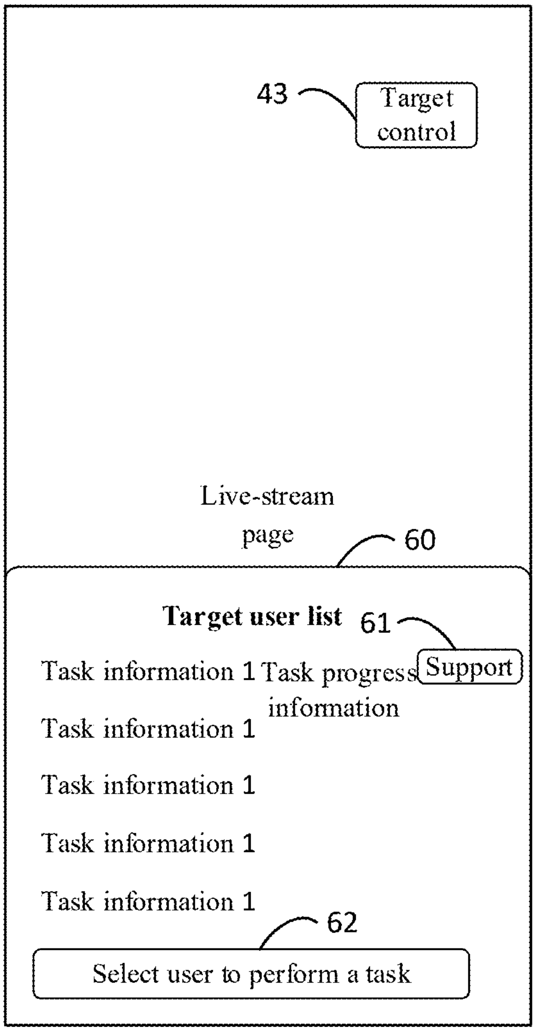
FIG. 6 is a schematic diagram of the display of a target user list according to an embodiment of the present disclosure.
Figure 7:
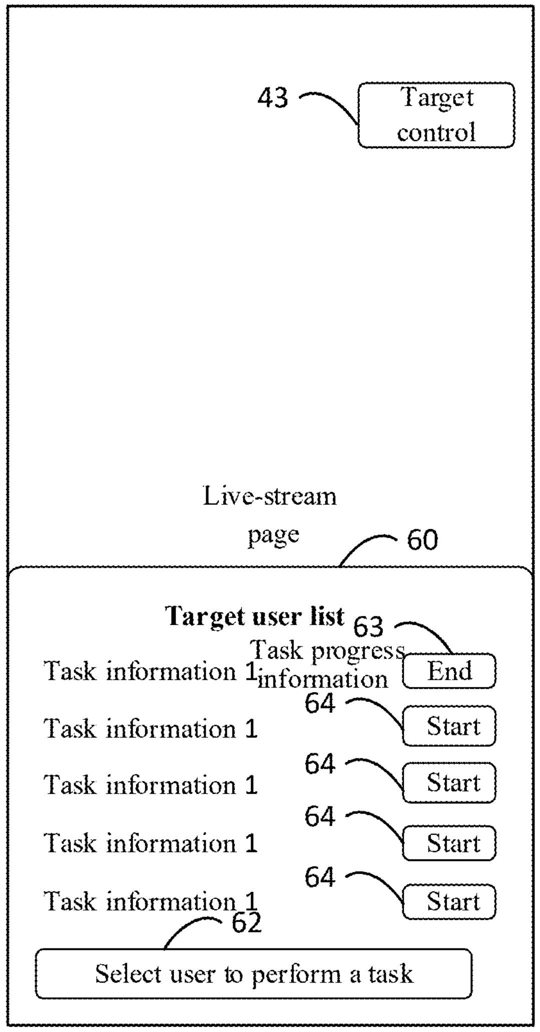
FIG. 7 is a schematic diagram of the display of another target user list according to an embodiment of the present disclosure.

In this embodiment, when the target user list display operation is received, a target user list 60 of the current live-stream room may be displayed, as shown in FIG. 6 and FIG. 7.

The content displayed in the target user list may not be exactly the same when the current user is not the streamer of the current live-stream room or is the streamer of the current live-stream room. For example, when the current user is not the streamer of the current live-stream room, the target user list may display a panel display control 61 and a list display control 62 corresponding to the current task-performing user, as shown in FIG. 6; and when the current user is the streamer of the current live-stream room, the target user list may display the list display control 62, a task ending control 63 corresponding to the current task-performing user, and a task starting control 64 corresponding to each pending task-performing user, as shown in FIG. 7, and the target user list may also display the panel display control 61 corresponding to the current task-performing user (not shown in FIG. 7).

The target user list display operation may be a trigger operation used to indicate the display of the target user list, such as an operation of triggering a target control displayed on the live-stream page. The target user list may display task information for a plurality of second users and the list display control, and may also display the execution progress information of the current task-performing user for the second task. The execution progress information may be information about a task performing progress when the current task-performing user performs the second task this time, which may be displayed in the form of a progress bar and/or a text.

In some implementations, the target user list displays a panel display control, and the panel display control is used to trigger displaying of a second virtual object panel. The second virtual object panel is used to give a virtual object to the second user.

The second virtual object panel may be a virtual object panel for a user to give a virtual object in the current live-stream room, such as a gift panel. The second virtual object panel may be used to display a plurality of virtual object identifiers including the preset virtual object identifier. Different from the first virtual object panel, the preset virtual object identifier displayed in the second virtual object panel may only be used to give the preset virtual object to a user corresponding to the user identifier displayed in the second virtual object panel, and is not used to request the user to perform the first task. The second virtual object panel may display the user identifiers. The user identifier may be an identifier of a user in the current live-stream room. The user may be, for example, a candidate user in the current live-stream room, such as a task guest. The description is made with the user identifier being the candidate user identifier as an example. A second switching control may be a control used to switch the user identifier displayed in the second virtual object panel.

Figure 8:
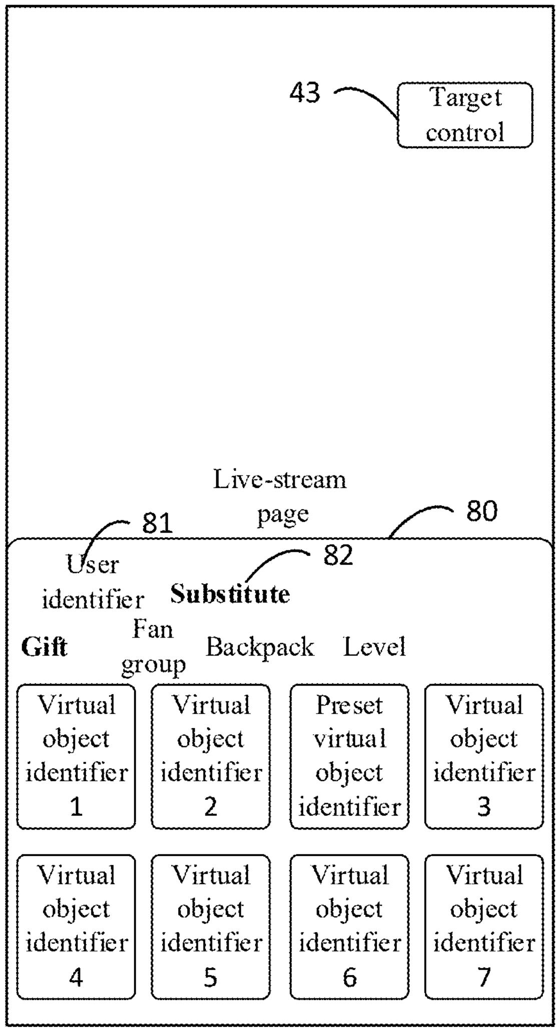
FIG. 8 is a schematic diagram of the display of a second virtual object panel according to an embodiment of the present disclosure.

Exemplarily, as shown in FIG. 6, when it is detected that the current user triggers the panel display control 61 in the target user list 60, a second virtual object panel 80 may be displayed, and at least one virtual object identifier, a user identifier 81 (e.g., the user identifier of the current task-performing user), and a second switching control 82 are displayed in the second virtual object panel 80, as shown in FIG. 8. Therefore, after the second virtual object panel 80 is displayed, the current user may switch, by triggering the second switching control 82, the user identifier 81 displayed in the second virtual object panel 80; alternatively, the current user may also switch the virtual object identifier displayed in the second virtual object panel 80, and give, by triggering a giving control corresponding to a virtual object identifier displayed in the second virtual object panel 80, a virtual object corresponding to the virtual object identifier to a user corresponding to a user identifier displayed in the second virtual object panel 80.

After giving a virtual object, the display of the second virtual object panel may be kept until a close operation for the second virtual object panel is received; alternatively, the display of the second virtual object panel may be canceled, which may be set according to needs.

In some implementations, the current user includes the streamer of the current live-stream room. The method further includes at least one of the following, after displaying the target user list of the current live-stream room: stopping, in response to a task ending operation for the current task-performing user, playing of audio data of the current task-performing user in the current live-stream room; or playing, in response to a task starting operation for a target pending task-performing user, audio data of the target pending task-performing user in the current live-stream room.

The task ending operation may be a trigger operation used to indicate that the second user stops performing the first task this time, such as an operation of triggering a task ending control corresponding to a second user. The task starting operation may be a trigger operation used to indicate that the second user starts to perform the first task, such as an operation of triggering a task starting control corresponding to a second user. The current task-performing user may be a user who currently performs the first task. The pending task-performing user may be a user waiting to perform the first task, and the target pending task-performing user may be a pending task-performing user targeted by the task starting operation.

In the above implementation, the streamer may instruct the second user in the target user list to start or stop performing the first task.

Exemplarily, when the current user is the streamer, the target user list may display task information of a plurality of second users, as well as the task ending control 63 corresponding to the current task-performing user and/or the task starting control 64 corresponding to each pending task-performing user, as shown in FIG. 7.

Therefore, when intending to end the first task performed by the current task-performing user, the current user may trigger the task ending control 63; and when intending to instruct a pending task-performing user to start performing the first task, the current user may trigger the task starting control 64 corresponding to the pending task-performing user.

Correspondingly, when the current application detects that the current user triggers the task ending control corresponding to the current task-performing user, the play of the audio data of the current task-performing user in the current live-stream room may be stopped, such as sending a task stopping request to the server to request, by the task stopping request, the server to control a client of the current task-performing user to close a microphone, and/or stop sending the audio data of the current task-performing user to a client of one or more users in the current live-stream room; and the display of this task information of the current task-performing user may be canceled.

When the current application detects that the current user triggers the task starting control corresponding to a pending task-performing user, audio data of the pending task-performing user may be played in the current live-stream room, such as sending a task starting request to the server to request, by the task starting request, the server to control a client of the current task-performing user to open a microphone, and/or send the audio data of the current task-performing user to the client of one or more users in the current live-stream room; and the display of execution progress information of the second user may be added, and the display of the task starting control triggered by the current user is switched to the display of the task stopping control.

S204: Display a candidate user list of the current live-stream room in response to the candidate user list display operation, and display at least one candidate user identifier and a selection completion control in the candidate user list, where the selection completion control is used to perform the task request operation.

The candidate user list display operation may be a trigger operation used to indicate the display of the candidate user list, such as an operation of triggering the list display control in the target user list. The candidate user list may be a list used for the current user to select a user requested to perform the first task. At least one candidate user identifier may be displayed in the candidate user list. The candidate user identifier may be an identifier of a candidate user. The candidate user may be a user that can be selected by the user and requested to perform the first task, such as a task guest in the current live-stream room. The selection completion control may be a control used to indicate the completion of candidate user selection, which may be used to perform the task request operation.

Figure 9:
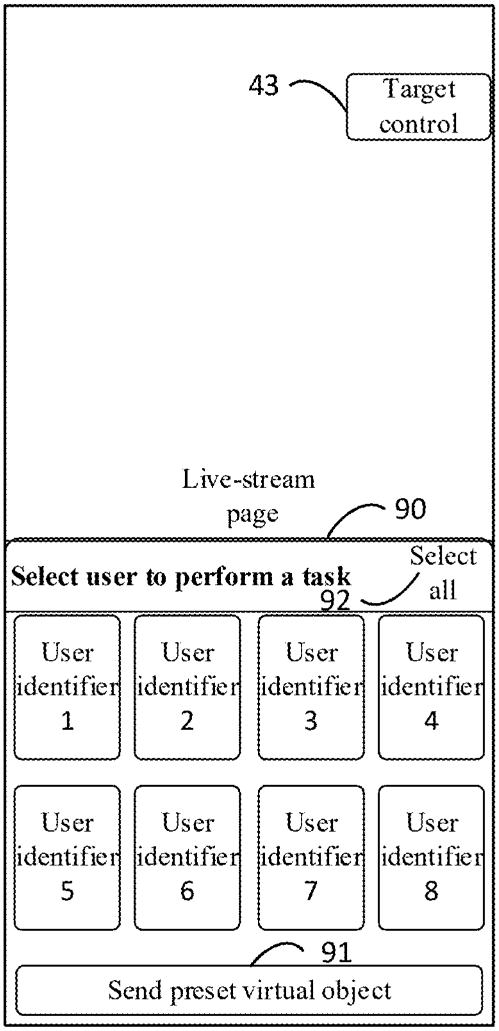
FIG. 9 is a schematic diagram of the display of a candidate user list according to an embodiment of the present disclosure.

Exemplarily, when the current application receives the candidate user list display operation and detects that the current user triggers the list display control 62 (as shown in FIG. 6 and FIG. 7) displayed in the target user list 60, a candidate user list 90 may be displayed, and at least one candidate user identifier and a selection completion control 91 are displayed in the candidate user list 90, as shown in FIG. 9.

Therefore, the current user may select one or more candidate users from the candidate user list as the first user requested to perform the first task, and trigger the selection completion control 91 displayed in the candidate user list 90 after the selection is completed.

Correspondingly, when the current application detects the selection operation of the user for the candidate user identifier, the user identifier selected by the current user may be displayed as a selected state; and when it is detected that the current user triggers the selection completion control 91 displayed in the candidate user list 90, the user corresponding to the candidate user identifier in the selected state in the candidate user list 90 is treated as the first user, and it is determined that the task request operation for the first user is received. Here, the selection operation of the candidate user identifier may include, for example, an operation of triggering a candidate user identifier that is in an unselected state or an operation of triggering a select all control 92 displayed in the candidate user list 90, etc.

S205: Receive the task request operation from the current user.

S206: Send, in response to the task request operation, the preset virtual object to the first user corresponding to the task request operation, and add the first user to the target user list of the current live-stream room, where the first user corresponds to the first user identifier displayed in the first virtual object panel, and/or, the first user corresponds to the second user identifier selected by the current user in the candidate user list, and the preset virtual object is used to request a user who receives the preset virtual object to perform the first task.

The second user identifier may be the candidate user identifier selected by the current user in the candidate user list, such as the candidate user identifier in the selected state in the candidate user list when the task request operation is received.

In this embodiment, the current user may request the user in the current live-stream room to perform the first task through the first virtual object panel or the candidate user list. For example, when it is detected that the current user triggers the giving control corresponding to the preset virtual object identifier in the first virtual object panel, the user corresponding to the first user identifier displayed in the first virtual object panel may be treated as the first user, and it is determined that the task request operation for the first user is received; and when it is detected that the current user triggers the selection completion control in the candidate user list, the user corresponding to the second user identifier in the selected state in the candidate user list may be treated as the first user, and it is determined that the task request operation for the first user is received.

According to the interaction method provided in this embodiment, a task performing request dimensioned by user can be achieved, the operation required for requesting other people to perform the task in the current live-stream room is simplified, and the request methods for requesting other people to perform the task are enriched.

Figure 10:
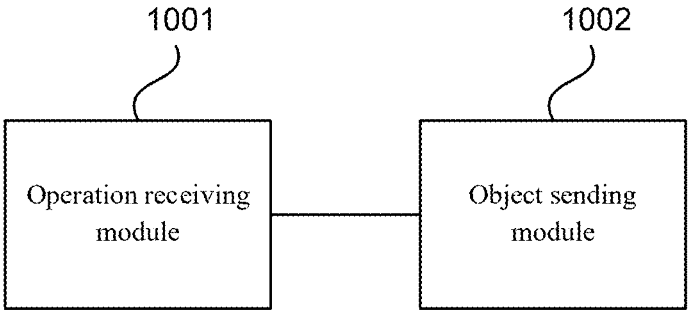
FIG. 10 is a block diagram of a structure of an interaction apparatus according to an embodiment of the present disclosure.

FIG. 10 is a block diagram of a structure of an interaction apparatus according to an embodiment of the present disclosure. The apparatus may be implemented by software and/or hardware, may be configured in an electronic device, such as a mobile phone or a tablet personal computer, and may perform an interaction method to request, in a current live-stream room, a user in the current live-stream room to perform a first task. As shown in FIG. 10, the interaction apparatus provided in this embodiment may include: an operation receiving module 1001 and an object sending module 1002.

The operation receiving module 1001 is configured to receive a task request operation from a current user; and the object sending module 1002 is configured to send, in response to the task request operation, a preset virtual object to a first user corresponding to the task request operation, and add the first user to a target user list of a current live-stream room, where the preset virtual object is used to request a user who receives the preset virtual object to perform a first task.

According to the interaction apparatus provided in this embodiment, the operation receiving module 1001 receives the task request operation from the current user; and the object sending module 1002 sends, in response to the task request operation, the preset virtual object to the first user corresponding to the task request operation, and adds the first user to the target user list of the current live-stream room, where the preset virtual object is used to request a user who receives the preset virtual object to perform the first task. By adopting the above technical solution in this embodiment, the corresponding user in the current live-stream room is requested to perform the first task by giving the preset virtual object, thereby achieving the task performing requirement dimensioned by user, enriching task requesting forms and task performing methods in the live-stream room, and simplifying the operation required for requesting other people to perform the task in the live-stream room.

In the above solution, the first user may correspond to a first user identifier displayed in a first virtual object panel. The interaction apparatus provided in this embodiment may also include: a first panel display module, configured to display the first virtual object panel in response to a panel display operation before receiving the task request operation from the current user, where the first virtual object panel is used to display at least one virtual object identifier, a first user identifier, and a first switching control, the at least one virtual object identifier includes a preset virtual object identifier, and the first switching control is used to switch the first user identifier.

In the above solution, the first user may correspond to a second user identifier selected by the current user in a candidate user list. The interaction apparatus provided in this embodiment may also include: a first list display module, configured to display the candidate user list of the current live-stream room in response to a candidate user list display operation before receiving the task request operation from the current user, and display at least one candidate user identifier and a selection completion control in the candidate user list, where the selection completion control is used to perform the task request operation.

Exemplarily, the interaction apparatus provided in this embodiment may also include: a second list display module, configured to display the target user list of the current live-stream room in response to a target user list display operation, where the target user list is used to display task information for a plurality of second users and a list display control, the second users include a current task-performing user and a pending task-performing user, and the list display control is used to perform the candidate user list display operation.

In the above solution, the current user may include a streamer of the current live-stream room. The interaction apparatus provided in this embodiment may also include at least one of the following:

a task stopping module, configured to stop, in response to a task ending operation for the current task-performing user, playing of audio data of the current task-performing user in the current live-stream room after displaying the target user list of the current live-stream room; or a task starting module, configured to play, in response to a task starting operation for a target pending task-performing user, audio data of the target pending task-performing user in the current live-stream room after displaying the target user list of the current live-stream room.

In the above solution, a panel display control may be displayed in the target user list, and may be used to trigger displaying of a second virtual object panel, and the second virtual object panel may be used to give a virtual object to the second user.

Exemplarily, the interaction apparatus provided in this embodiment may also include: a control display module, configured to display, before the displaying a target user list of the current live-stream room, at least one of task performing information and a target control for a second task by at least one candidate user in the current live-stream room after the streamer of the current live-stream room initiates a preset game, where the target control is used to perform the target user list display operation.

In the above solution, the current user may include the streamer of the current live-stream room. The interaction apparatus provided in this embodiment may also include: a second panel display module, configured to display a preset virtual object selection panel in response to an initiation operation for the preset game before receiving the task request operation from the current user; and an object selection module, configured to use, in response to a selection completion operation in the preset virtual object selection panel, a virtual object selected by the current user in the preset virtual object selection panel as a preset virtual object for the preset game, and initiate the preset game.

The interaction apparatus provided in this embodiment of the present disclosure may perform the interaction method provided in any embodiment of the present disclosure, and has corresponding functional modules and effects for performing the interaction method. For technical details that are not described in detail in this embodiment, reference may be made to the interaction method provided in any embodiment of the present disclosure.

Figure 11:
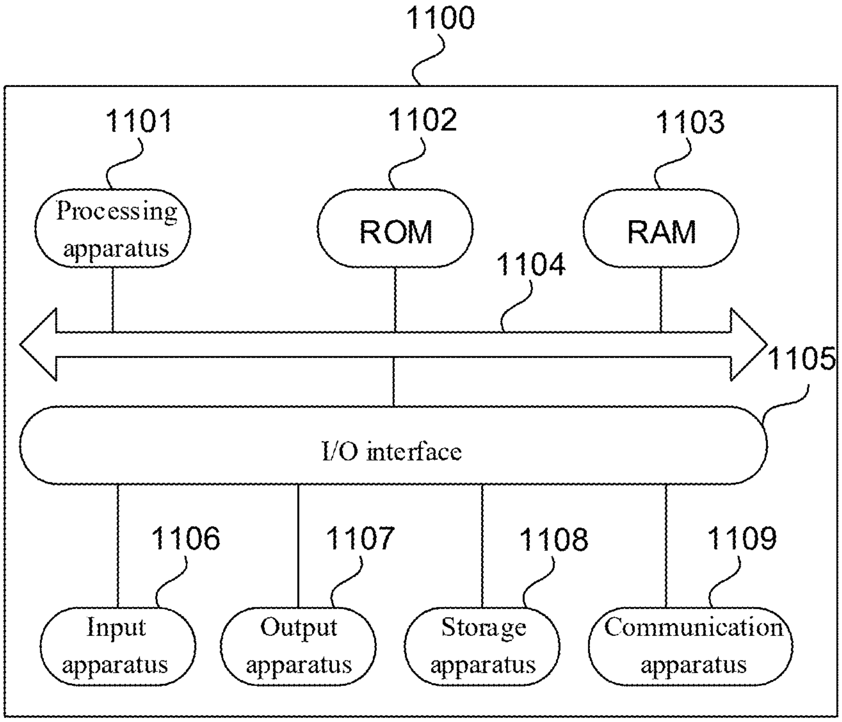
FIG. 11 is a schematic diagram of a structure of an electronic device according to an embodiment of the present disclosure.

Referring to FIG. 11 below, FIG. 11 illustrates a schematic diagram of a structure of an electronic device (e.g., a terminal device) 1100 suitable for implementing an embodiment of the present disclosure. The terminal device in this embodiment of the present disclosure may include mobile terminals such as a mobile phone, a notebook computer, a digital radio receiver, a personal digital assistant (PDA), a portable Android device (PAD), a portable media player (PMP), and a vehicle-mounted terminal (e.g., a vehicle-mounted navigation terminal), and fixed terminals such as a digital television (TV) and a desk computer. The electronic device shown in FIG. 11 is merely an example and should not impose any limitations on the functions and scope of use of this embodiment of the present disclosure.

As shown in FIG. 11, the electronic device 1100 may include a processing apparatus (e.g., a central processing unit and a graphics processing unit) 1101. The processing apparatus 1101 may perform various appropriate actions and processing according to a program stored in a read-only memory (ROM) 1102 or a program loaded from a storage apparatus 1108 into a random access memory (RAM) 1103. The RAM 1103 further stores various programs and data required for the operation of the electronic device 1100. The processing apparatus 1101, the ROM 1102, and the RAM 1103 are connected to one another through a bus 1104. An input/output (I/O) interface 1105 is also connected to the bus 1104.

Typically, the following apparatuses may be connected to the I/O interface 1105: an input apparatus 1106, including, for example, a touchscreen, a touchpad, a keyboard, a mouse, a camera, a microphone, an accelerometer, and a gyroscope; an output apparatus 1107, including, for example, a liquid crystal display (LCD), a speaker, and a vibrator; the storage apparatus 1108, including, for example, a magnetic tape and a hard drive; and a communication apparatus 1109. The communication apparatus 1109 may allow the electronic device 1100 to perform wireless or wired communication with other devices to exchange data. Although FIG. 11 illustrates the electronic device 1100 with various apparatuses, it is not necessary to implement or have all the shown apparatuses. It may be an alternative to implement or have more or fewer apparatuses.

According to this embodiment of the present disclosure, the foregoing process described with reference to the flowchart may be implemented as a computer software program. For example, an embodiment of the present disclosure includes a computer program product, which includes a computer program carried on a non-transitory computer-readable medium, where the computer program includes program code used to perform the method shown in the flowchart. In this embodiment, the computer program may be downloaded and installed from the network through the communication apparatus 1109, installed from the storage apparatus 1108, or installed from the ROM 1102. The computer program, when executed by the processing apparatus 1101, performs the above functions defined in the method in the embodiments of the present disclosure.

The computer-readable medium in the present disclosure may be a computer-readable signal medium, or a computer-readable storage medium, or any combination of the above. For example, the computer-readable storage medium may include: electrical, magnetic, optical, electromagnetic, infrared, or semiconductor systems, apparatuses, or devices, or any combination of the above. The computer-readable storage medium may include: an electrical connection with one or more wires, a portable computer disk, a hard drive, a RAM, a ROM, an erasable programmable read-only memory (EPROM), a flash, an optical fiber, a portable compact disc read-only memory (CD-ROM), an optical storage device, a magnetic storage device, or any suitable combination of the above. In the present disclosure, the computer-readable storage medium may be any tangible medium including or storing a program, and the program may be used by or in combination with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in combination with the instruction execution system, apparatus, or device. The program code included in the computer-readable medium may be transmitted by any proper medium including: a wire, an optical cable, radio frequency (RF), etc., or any suitable combination of the above. The storage medium may be a non-transitory storage medium.

In some implementations, a client and a server may communicate using any currently known or future-developed network protocols such as a hypertext transfer protocol (HTTP), and may also be interconnected with digital data communication in any form or medium (e.g., a communication network). Examples of the communication network include a local area network (LAN), a wide area network (WAN), Internet work (e.g., Internet), a peer-to-peer network (e.g., an ad hoc peer-to-peer network), and any currently known or future-developed networks.

The computer-readable medium may be included in the above electronic device; or may also separately exist without being assembled in the electronic device.

The above computer-readable medium carries one or more programs, and the one or more programs, when executed by the electronic device, cause the electronic device to: receive a task request operation from a current user; and send, in response to the task request operation, a preset virtual object to a first user corresponding to the task request operation, and add the first user to a target user list of a current live-stream room, where the preset virtual object is used to request a user who receives the preset virtual object to perform a first task.

Computer program code for performing the operations in the present disclosure may be written in one or more programming languages or a combination thereof, where the programming languages include an object-oriented programming language, such as Java, Smalltalk, and C++, and further include conventional procedural programming languages, such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a LAN or WAN, or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code includes one or more executable instructions for implementing specified logic functions. In some alternative implementations, functions marked in the blocks may also occur in an order different from that marked in the accompanying drawings. For example, two blocks shown in succession may actually be performed substantially in parallel, or may sometimes be performed in a reverse order, depending on the functions involved. Each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The name of the module does not limit the module itself in a certain case.

Herein, the functions described above may be at least partially executed by one or more hardware logic components. For example, exemplary hardware logic components that can be used include: a field programmable gate array (FPGA), an application specific integrated circuit (ASIC), application specific standard parts (ASSPs), a system on chip (SOC), a complex programmable logic device (CPLD), etc.

In the context of the present disclosure, a machine-readable medium may be a tangible medium that may include or store a program for use by or for use in combination with the instruction execution system, apparatus, or device. The machine-readable medium may be a machine-readable signal medium or a machine-readable storage medium. The machine-readable medium may include electronic, magnetic, optical, electromagnetic, infrared, or semiconductor systems, apparatuses, or devices, or any suitable combination of the above content. The machine-readable storage medium includes: an electrical connection based on one or more wires, a portable computer disk, a hard drive, a RAM, a ROM, an EPROM, a flash memory, an optical fiber, a portable CD-ROM, an optical storage device, a magnetic storage device, or any suitable combination of the above content.

According to one or more embodiments of the present disclosure, Example 1 provides an interaction method, including:

receiving a task request operation from a current user; and sending, in response to the task request operation, a preset virtual object to a first user corresponding to the task request operation, and adding the first user to a target user list of a current live-stream room, where the preset virtual object is used to request a user who receives the preset virtual object to perform a first task.

According to one or more embodiments of the present disclosure, Example 2 provides the method according to Example 1, where the first user corresponds to a first user identifier displayed in a first virtual object panel, and the method further includes, before receiving the task request operation from the current user:

displaying the first virtual object panel in response to a panel display operation, where the first virtual object panel is used to display at least one virtual object identifier, the first user identifier, and a first switching control, the at least one virtual object identifier includes a preset virtual object identifier, and the first switching control is used to switch the first user identifier.

According to one or more embodiments of the present disclosure, Example 3 provides the method according to Example 1, where the first user corresponds to a second user identifier selected by the current user in a candidate user list, and the method further includes: before receiving the task request operation from the current user:

displaying a candidate user list of the current live-stream room in response to a candidate user list display operation, and displaying at least one candidate user identifier and a selection completion control in the candidate user list, where the selection completion control is used to perform the task request operation.

According to one or more embodiments of the present disclosure, Example 4 provides the method according to Example 3, further including:

displaying a target user list of the current live-stream room in response to a target user list display operation, where the target user list is used to display task information for a plurality of second users and a list display control, the second users include a current task-performing user and a pending task-performing user, and the list display control is used to perform the candidate user list display operation.

According to one or more embodiments of the present disclosure, Example 5 provides the method according to Example 4, where the current user includes a streamer of the current live-stream room, and the method further includes at least one of the following, after displaying the target user list of the current live-stream room:

stopping, in response to a task ending operation for the current task-performing user, playing of audio data of the current task-performing user in the current live-stream room; or playing, in response to a task starting operation for a target pending task-performing user, audio data of the target pending task-performing user in the current live-stream room.

According to one or more embodiments of the present disclosure, Example 6 provides the method according to any one of Examples 1 to 5, where a panel display control is displayed in the target user list, the panel display control is used to trigger displaying of a second virtual object panel, and the second virtual object panel is used to give a virtual object to a second user.

According to one or more embodiments of the present disclosure, Example 7 provides the method according to any one of Examples 1 to 5, where before the displaying a target user list of the current live-stream room, the method further includes:

displaying at least one of task performing information and a target control for a second task by at least one candidate user in the current live-stream room after the streamer of the current live-stream room initiates a preset game, where the target control is used to perform the target user list display operation.

According to one or more embodiments of the present disclosure, Example 8 provides the method according to any one of Examples 1 to 5, where the current user includes a streamer of the current live-stream room, and the method further includes: before receiving the task request operation from the current user:

displaying a preset virtual object selection panel in response to an initiation operation for the preset game; and using, in response to a selection completion operation in the preset virtual object selection panel, a virtual object selected by the current user in the preset virtual object selection panel as a preset virtual object for the preset game, and initiating the preset game.

According to one or more embodiments of the present disclosure, Example 9 provides an interaction apparatus, including:

an operation receiving module, configured to receive a task request operation from a current user; and an object sending module, configured to send, in response to the task request operation, a preset virtual object to a first user corresponding to the task request operation, and add the first user to a target user list of a current live-stream room, where the preset virtual object is used to request a user who receives the preset virtual object to perform a first task.

According to one or more embodiments of the present disclosure, Example 10 provides an electronic device, including:

one or more processors; and a memory, configured to store one or more programs, where the one or more programs, when executed by the one or more processors, cause the one or more processors to implement the interaction method according to any one of Examples 1 to 8.

According to one or more embodiments of the present disclosure, Example 11 provides a computer-readable storage medium, storing a computer program, where the computer program, when executed by a processor, implements the interaction method according to any one of Examples 1 to 8.

According to one or more embodiments of the present disclosure, Example 12 provides a computer program product, where the computer program product, when executed by a computer, causes the computer to implement the interaction method according to any one of Examples 1 to 8.

Further, although the plurality of operations are described in a particular order, it should not be understood as requiring these operations to be performed in the shown particular order or in a sequential order. In certain environments, multitasking and parallel processing may be advantageous. Similarly, although several implementation details are included in the above discussion, these implementation details should not be interpreted as limitations on the scope of the present disclosure. Some features described in the context of separate embodiments may also be implemented in combination in a single embodiment. In contrast, various features described in the context of a single embodiment may also be implemented in a plurality of embodiments separately or in any suitable subcombination.

Although the subject matter has been described in a language specific to structural features and/or logic actions of the method, it should be understood that the subject matter defined in the appended claims is not necessarily limited to the specific features or actions described above. On the contrary, the specific features and the actions described above are merely example forms for implementing the claims.

We claim:

1. An interaction method, comprising:

receiving a task request operation from a current user;

sending, in response to the task request operation, a preset virtual object to a first user corresponding to the task request operation, and adding the first user to a target user list of a current livestream, wherein the preset virtual object is used to request a user who receives the preset virtual object to perform a first task, and wherein the first user corresponds to a second user identifier selected by the current user in a candidate user list;

wherein before receiving the task request operation from the current user, the interaction method further comprises:

displaying the candidate user list of the current livestream in response to a candidate user list display operation; and displaying at least one candidate user identifier and a selection completion control in the candidate user list, wherein the selection completion control is configured to perform the task request operation.

2. The interaction method of claim 1, wherein the first user corresponds to a first user identifier displayed in a first virtual object panel, and the method further comprises, before receiving the task request operation from the current user:

displaying the first virtual object panel in response to a panel display operation, wherein the first virtual object panel is used to display at least one virtual object identifier, the first user identifier, and a first switching control, the at least one virtual object identifier comprises a preset virtual object identifier, and the first switching control is used to switch the first user identifier.

3. The interaction method of claim 1, further comprising:

displaying a target user list of the current livestream in response to a target user list display operation, wherein the target user list is used to display task information for a plurality of second users and a list display control, the second users comprise a current task-performing user and a pending task-performing user, and the list display control is used to perform the candidate user list display operation.

4. The interaction method of claim 3, wherein the current user comprises a streamer of the current livestream, and the method further comprises at least one of the following after displaying the target user list of the current livestream:

stopping, in response to a task ending operation for the current task-performing user, playing of audio data of the current task-performing user in the current livestream; or playing, in response to a task starting operation for a target pending task-performing user, audio data of the target pending task-performing user in the current livestream.

5. The interaction method of claim 1, wherein a panel display control is displayed in the target user list, the panel display control is used to trigger displaying of a second virtual object panel, and the second virtual object panel is used to give a virtual object to the second user.

6. The interaction method of claim 3, wherein the method further comprises, before displaying the target user list of the current livestream:

displaying at least one of task performing information for a second task by at least one candidate user and a target control in the current livestream after the streamer of the current livestream initiates a preset game, wherein the target control is used to perform the target user list display operation.

7. The interaction method of claim 1, wherein the current user comprises a streamer of the current livestream, and the method further comprises, before receiving the task request operation from the current user:

displaying a preset virtual object selection panel in response to an initiation operation for the preset game; and using, in response to a selection completion operation in the preset virtual object selection panel, a virtual object selected by the current user in the preset virtual object selection panel as a preset virtual object for the preset game, and initiating the preset game.

8. An electronic device, comprising:

at least one processor; and a memory which is communicatively connected with the at least one processor, wherein the memory stores a computer program executable by the at least one processor, and the computer program, when executed by the at least one processor, causes the at least one processor to perform acts comprising:

receiving a task request operation from a current user;

sending, in response to the task request operation, a preset virtual object to a first user corresponding to the task request operation, and add the first user to a target user list of a current livestream, wherein the preset virtual object is used to request a user who receives the preset virtual object to perform a first task, and wherein the first user corresponds to a second user identifier selected by the current user in a candidate user list;

wherein before receiving the task request operation from the current user, the acts further comprise:

displaying the candidate user list of the current livestream in response to a candidate user list display operation; and display at least one candidate user identifier and a selection completion control in the candidate user list, wherein the selection completion control is configured to perform the task request operation.

9. The electronic device of claim 8, wherein the first user corresponds to a first user identifier displayed in a first virtual object panel, and the computer program further causes the at least one processor to, before receiving the task request operation from the current user:

display the first virtual object panel in response to a panel display operation, wherein the first virtual object panel is used to display at least one virtual object identifier, the first user identifier, and a first switching control, the at least one virtual object identifier comprises a preset virtual object identifier, and the first switching control is used to switch the first user identifier.

10. The electronic device of claim 8, the computer program further causes the at least one processor to:

display a target user list of the current livestream in response to a target user list display operation, wherein the target user list is used to display task information for a plurality of second users and a list display control, the second users comprise a current task-performing user and a pending task-performing user, and the list display control is used to perform the candidate user list display operation.

11. The electronic device of claim 10, wherein the current user comprises a streamer of the current livestream, and the computer program further causes the at least one processor to, after displaying the target user list of the current livestream:

stop, in response to a task ending operation for the current task-performing user, playing of audio data of the current task-performing user in the current livestream.

12. The electronic device of claim 10, wherein the current user comprises a streamer of the current livestream, and the computer program further causes the at least one processor to, after displaying the target user list of the current livestream:

play, in response to a task starting operation for a target pending task-performing user, audio data of the target pending task-performing user in the current livestream.

13. The electronic device of claim 8, wherein a panel display control is displayed in the target user list, the panel display control is used to trigger displaying of a second virtual object panel, and the second virtual object panel is used to give a virtual object to the second user.

14. The electronic device of claim 10, wherein the computer program further causes the at least one processor to, before displaying the target user list of the current livestream:

display at least one of task performing information for a second task by at least one candidate user and a target control in the current livestream after the streamer of the current livestream initiates a preset game, wherein the target control is used to perform the target user list display operation.

15. The electronic device of claim 8, wherein the current user comprises a streamer of the current livestream, and the computer program further causes the at least one processor to, before receiving the task request operation from the current user:

display a preset virtual object selection panel in response to an initiation operation for the preset game; and use, in response to a selection completion operation in the preset virtual object selection panel, a virtual object selected by the current user in the preset virtual object selection panel as a preset virtual object for the preset game, and initiating the preset game.

16. A non-transitory computer-readable storage medium, storing computer instructions, wherein the computer instructions, when executed by a processor, are used to cause the processor to perform acts comprising:

receiving a task request operation from a current user;

sending, in response to the task request operation, a preset virtual object to a first user corresponding to the task request operation, and add the first user to a target user list of a current livestream, wherein the preset virtual object is used to request a user who receives the preset virtual object to perform a first task, and wherein the first user corresponds to a second user identifier selected by the current user in a candidate user list;

wherein before receiving the task request operation from the current user, the acts further comprise:

displaying the candidate user list of the current livestream in response to a candidate user list display operation; and display at least one candidate user identifier and a selection completion control in the candidate user list, wherein the selection completion control is configured to perform the task request operation.

17. The non-transitory computer-readable storage medium of claim 16, wherein the first user corresponds to a first user identifier displayed in a first virtual object panel, and the computer program further causes the at least one processor to, before receiving the task request operation from the current user:

display the first virtual object panel in response to a panel display operation, wherein the first virtual object panel is used to display at least one virtual object identifier, the first user identifier, and a first switching control, the at least one virtual object identifier comprises a preset virtual object identifier, and the first switching control is used to switch the first user identifier.

* * * * *